(12) United States Patent
Park et al.

(10) Patent No.: US 8,848,133 B2
(45) Date of Patent: Sep. 30, 2014

(54) HYBRID TYPE LIQUID CRYSTAL DISPLAY DEVICE

(75) Inventors: Se-Hong Park, Gyeonggi-do (KR); Eung-Do Kim, Gyeonggi-do (KR); Jong-Sin Park, Seoul (KR)

(73) Assignee: LG Display Co., Ltd., Seoul (KR)

( * ) Notice: Subject to any disclaimer, the term of this patent is extended or adjusted under 35 U.S.C. 154(b) by 525 days.

(21) Appl. No.: 12/971,242

(22) Filed: Dec. 17, 2010

(65) Prior Publication Data

US 2011/0261289 A1    Oct. 27, 2011

(30) Foreign Application Priority Data

Apr. 23, 2010   (KR) .................. 10-2010-0037870

(51) Int. Cl.
| | | |
|---|---|---|
| G02F 1/1335 | (2006.01) |
| A63F 13/00 | (2014.01) |
| G09F 13/04 | (2006.01) |
| G09F 13/08 | (2006.01) |

(52) U.S. Cl.
USPC ................. 349/65; 463/32; 349/96; 362/97.2

(58) Field of Classification Search
USPC .......... 463/32–34; 349/65, 96; 362/97.1–97.3
See application file for complete search history.

(56) References Cited

U.S. PATENT DOCUMENTS

| 6,163,351 | A * | 12/2000 | Nakayama ...................... 349/61 |
| 7,021,812 | B2 | 4/2006 | Maeda et al. |
| 2004/0209668 | A1* | 10/2004 | Okada .............................. 463/20 |
| 2005/0117095 | A1* | 6/2005 | Ma ................................. 349/113 |
| 2007/0177406 | A1* | 8/2007 | Kimura et al. ................. 362/616 |
| 2008/0088773 | A1* | 4/2008 | Tang et al. ....................... 349/96 |
| 2008/0117367 | A1* | 5/2008 | Abe ................................ 349/106 |
| 2008/0129916 | A1* | 6/2008 | Ota et al. ......................... 349/58 |
| 2009/0036208 | A1* | 2/2009 | Pennington et al. ............. 463/33 |
| 2009/0236971 | A1 | 9/2009 | Kuo et al. |
| 2009/0284687 | A1* | 11/2009 | Kirita et al. ..................... 349/65 |
| 2009/0290096 | A1 | 11/2009 | Yoon et al. |

FOREIGN PATENT DOCUMENTS

| CN | 1967320 A | 5/2007 |
| JP | 2009-230107 | 10/2009 |
| KR | 10-2009-0120564 | 11/2009 |
| KR | 10-2009-0122023 | 11/2009 |
| TW | 201001014 A | 1/2010 |

OTHER PUBLICATIONS

Office Action dated Sep. 27, 2012 for corresponding KR patent application No. 10-2010-0037870.

(Continued)

*Primary Examiner* — Dennis Y Kim
(74) *Attorney, Agent, or Firm* — Morgan, Lewis & Bockius LLP (57) ABSTRACT

The present disclosure relates to a hybrid type liquid crystal display device. The present disclosure suggests a hybrid type liquid crystal display device comprising a liquid crystal display panel having a display area; and a window area defined within the display area, wherein an image disposed at outside of the liquid crystal display panel is shown in front of the liquid crystal panel through the window area. The present disclosure suggests a hybrid type display device in which main video data is represented using the liquid crystal display device, an additional image represented on an external screen is shown through the liquid crystal display device, or the external image can be shown by overlapping with the main video data of the liquid crystal display device, as needed.

11 Claims, 6 Drawing Sheets

(56) References Cited

OTHER PUBLICATIONS

Office Action dated Jul. 31, 2013 from the Taiwan Patent Office in counterpart Taiwanese patent application No. 099145559.

The Second Office Action dated Mar. 7, 2014 from The State Intellectual Property Office of the People's Republic of China in counterpart Chinese application No. 201010620183.9.

* cited by examiner

FIG. 1

Related Art

HYBRID TYPE LIQUID CRYSTAL DISPLAY DEVICE

This application claims the benefit of Korea Patent Application No. 10-2010-0037870 filed on Apr. 23, 2010, which is incorporated herein by reference for all purposes as if fully set forth herein.

BACKGROUND OF THE INVENTION

1. Field of the Invention

The present disclosure relates to a hybrid type liquid crystal display device (or 'LCD'). Especially, the present disclosure relates to a hybrid liquid crystal display device in which some portions represent external images disposed behind the liquid crystal panel so that this external image is shown with the images represented by the liquid crystal display device itself.

2. Discussion of the Related Art

As the features of the light weight, the thin panel, and the lower driving electric consumption, the application of the LCD is prevailed for various fields. For examples, the LCD is applied to the portable computer including notebook computers, the office automation devices, the audio/video system, or the outdoor/indoor commercial advertising devices. The transparent type liquid crystal display device, mostly used type, implements the video data by modulating the light incident from the back light unit.

Figure 1:
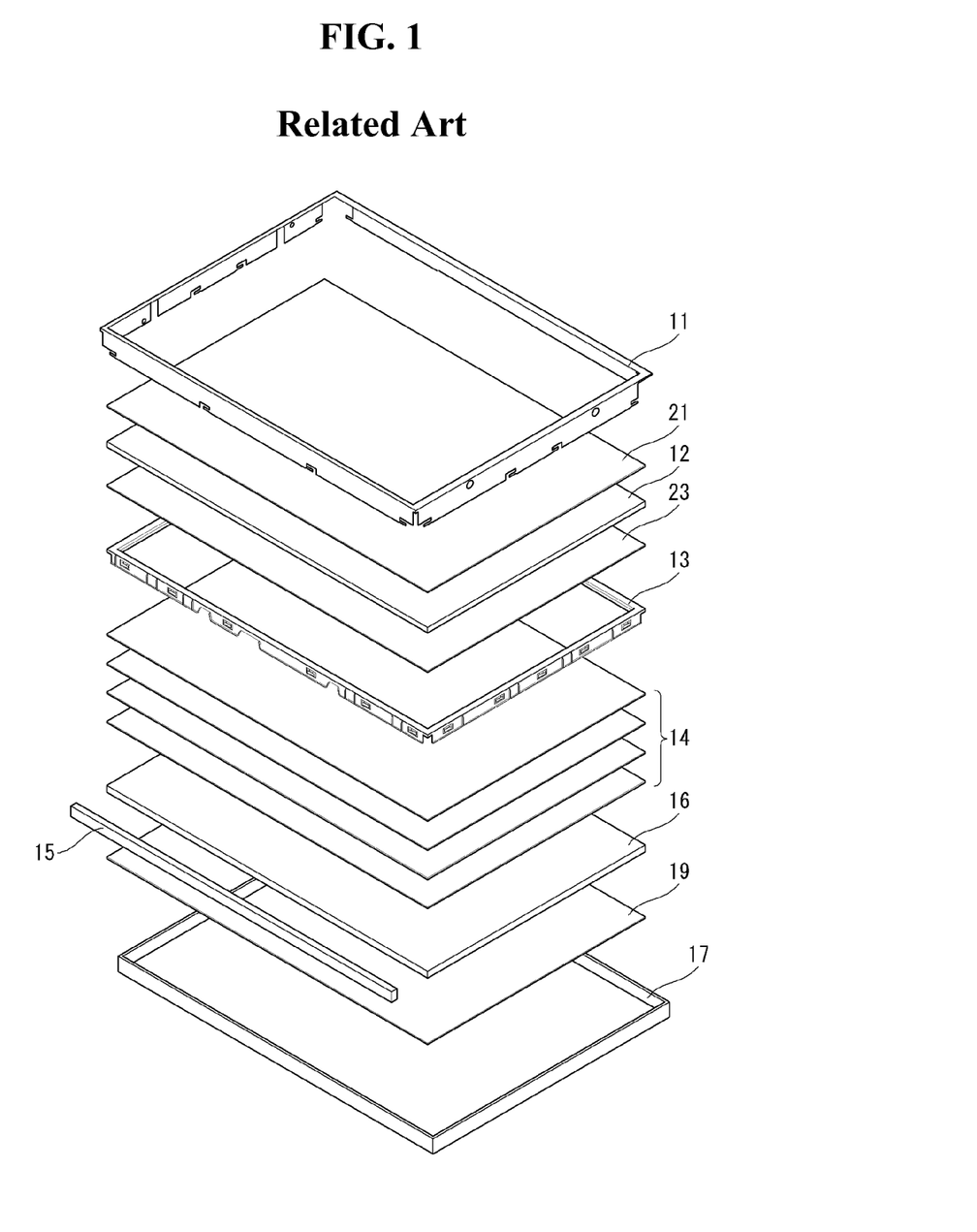
FIG. 1 is an assembling perspective view illustrating the liquid crystal display device having an edge type back light unit according to the related art.

FIG. 1 is an assembling perspective view illustrating the structure of the liquid crystal display device according to the related art. Referring to FIG. 1, the liquid crystal display device having the edge type back light unit comprises the liquid crystal display panel (or LCD panel) 12, and the edge back light unit disposed under the LCD panel 12.

The LCD panel 12 includes an upper substrate, a lower substrate, and a liquid crystal layer of any mode type between the two substrates. At the front and rear sides of the LCD panel 12, a first polarization film 21 and a second polarization film 23 are disposed, respectively.

The edge type back light unit comprises a light source 15, a light guide panel 16, and a plurality of optical sheets 14, and irradiates the back light to the LCD panel 12 by changing the light of the light source to a surface source light. The light source 15 supplies the light to at least one side surface of the light guide panel 16. The optical sheets 14 include one or more prism sheet and one or more diffusion sheet for diffusing the light from the light guide panel 16 and guiding the light to vertically enter into the light incident surface of the LCD panel 12. The optical sheets 14 may have the dual brightness enhancement film (or 'DBEF').

Under the light source 15 and the light guide panel 16, a reflective sheet 19 is disposed. The reflective sheet 19 reuses the light lost through the rear surface of the light guide panel 16 by reflecting it to the front side where the LCD panel 12 is disposed.

There is a cover bottom 17 under the light source 15, the light guide panel 16 and the reflective sheet 19. The cover bottom 17 includes the material high strength and high thermal conductivity for quickly radiating the heat from the light source 15 to external of the LCD device. Fore example, the cover bottom 17 may comprises a metallic coated plate such as aluminum, aluminum-nitride (AlN), Electrolytic Galvanized Iron (EGI), stainless steel, galvaume (SGLC), aluminum coated iron (ZnAl), and tin coated plate (SPTE). Furthermore, materials for enhancing the thermal conductivity can be coated on the cover bottom 17.

A guide panel 13 and a top case 11 are disposed by surrounding the LCD panel 12. The guide panel 13 is the rectangular molded frame made of the synthetic resin (such as polycarbonate) with the glass fiber, and wraps the upper circumferences and the sides of the LCD panel 12 and the sides of the back light unit. The guide panel 13 supports the LCD panel 12, and maintains the gap between the LCD panel 12 and the optical sheets 14 evenly. The top case 11 made of the metal materials like the cover bottom 17 surrounds the upper surface and the side surface of the guide panel 13, and is fixed with at least one of the guide panel 13 and the cover bottom 17 using hooks or screws.

The LCD is one of the display device for implementing video data by irradiating the light from the light source to the LCD panel disposed between two polarizing sheets of which polarizing axes are perpendicularly set, and by controlling the transmissivity of the polarized light using the polarizing property of the light and the anisopropic light refractive property of the liquid crystal material. Therefore, the LCD can passively display the video image on the display area of the display system according to the electric signals. In some cases for implementing complex video data, it is required for a hybrid display system in that the LCD image is combined with an additional image represented on an external screen disposed behind the LCD.

However, the LCD according to the related art is for showing the video data singly because it can not pass any external images through itself. Furthermore, there is no idea for LCD to implement complex images by combining or mixing the video images of the LCD with the external images.

SUMMARY OF THE INVENTION

In order to overcome the above mentioned drawbacks, one purpose of the present disclosure is to suggest a hybrid type liquid crystal display device in which the video data is represented on the display area and, at the same time, an additional image on the external screen is shown through some portions of the display area of the liquid crystal display device. Another purpose of the present disclosure is to suggest a hybrid type display device in which main video data is represented using the liquid crystal display device, an additional image represented on an external screen is shown through the liquid crystal display device, or the external image can be shown by overlapping with the main video data of the liquid crystal display device, as needed.

In order to accomplish the above purpose, the present disclosure suggests a hybrid type liquid crystal display device comprising a liquid crystal display panel having a display area; and a window area defined within the display area, wherein an image disposed at outside of the liquid crystal display panel is shown in front of the liquid crystal panel through the window area.

The device further comprises a first polarization film disposed at front surface of the liquid crystal display panel with a size corresponding to the display area and a first polarization axis; a light guide panel disposed at a rear surface of the liquid crystal display panel; a light source disposed at side surface of the light guide panel for providing a back light into the light guide panel; a second polarization film disposed behind the liquid crystal display panel for polarizing the back light to a second polarization axis perpendicular to the first polarization axis; a reflection sheet disposed at rear surface of the light guide panel for reflecting the back light to the front surface of the light guide panel, and having an aperture area corresponding to the window area; and a cover bottom disposed at rear surface of the reflection sheet for housing the light guide panel and the light source, and having an aperture portion corresponding to the window area.

The second polarization film is disposed between the light guide panel and the light source to polarize the back light to the second polarization axis.

The light guide panel includes a plurality of a polarized light protection pattern formed on a rear surface of the light guide panel to protect the polarized light having the second polarization axis.

The second polarization film comprises: a side polarization film disposed on the side surface of the light guide panel and between the light source and the light guide panel, wherein the side polarization film polarizes a portion of the back light corresponding to the window area to have the second polarization axis; and a lower polarization film disposed on the rear surface of the liquid crystal display panel, and having an opening area corresponding to the window area, wherein the lower polarization film polarizes a portion of the back light corresponding to the display area excepting the window area to have the second polarization axis.

The light guide panel includes: a plurality of polarized light protection pattern disposed on a portion of a rear surface of the light guide panel corresponding to the window area to protect the polarized light having the second polarization axis; and a plurality of reflective pattern disposed on a portion of a rear surface of the light guide panel excepting the window area to reflect the back light to a front surface of the light guide panel.

The device further comprises optical sheets disposed between the lower polarization film and the light guide panel, wherein a portion of the optical sheets corresponding to the window area is removed.

The optical sheets includes: a lower diffusion film disposed on a front surface of the light guide panel; a prism sheet stacked on a front surface of the lower diffusion film; and an upper diffusion film stacked on a front surface of the prism sheet.

The second polarization film including a lower polarization film disposed between the liquid crystal display panel and the light guide panel with a plan size corresponding to the display area.

The lower polarization film has a portion corresponding to the window area, wherein the portion of the lower polarization film has light transmissivity of 60%.

The light guide panel includes: a plurality of reflective pattern disposed on a portion of a rear surface of the light guide panel excepting the window area to reflect the back light to a front surface of the light guide panel, wherein the portion of the rear surface of the light guide panel has no pattern.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Figure 2:
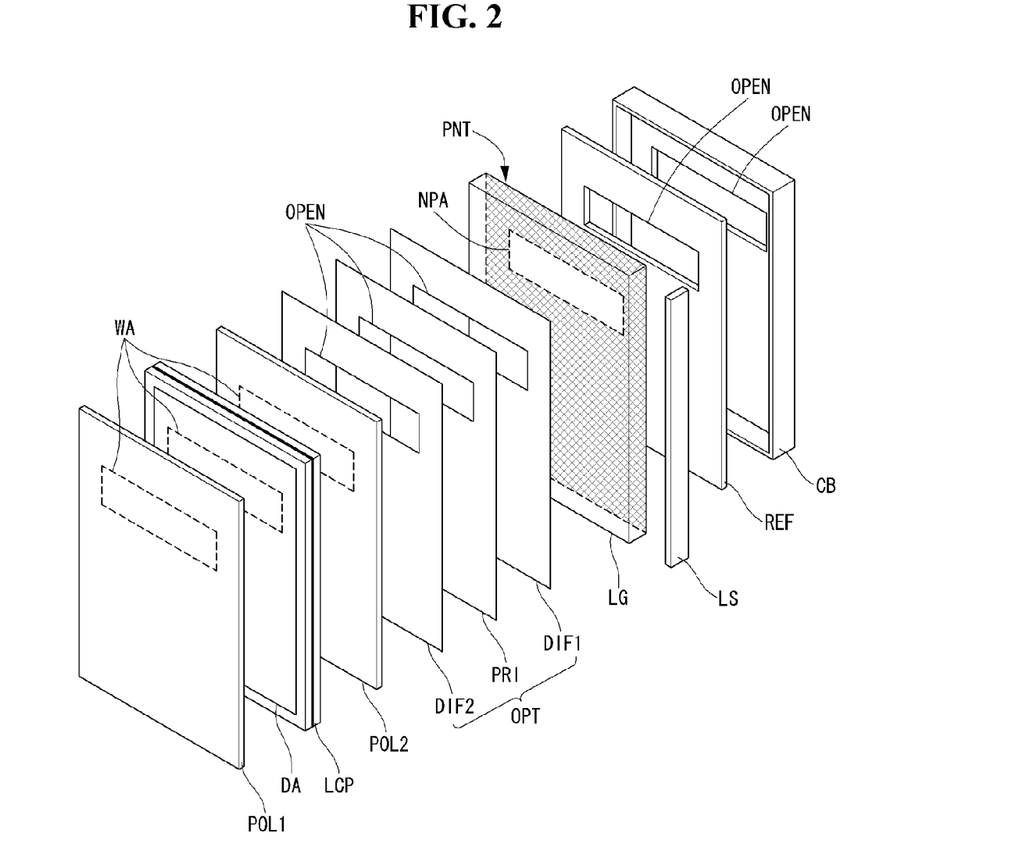
FIG. 2 is an assembling perspective view illustrating a hybrid type liquid crystal display device according to the first embodiment of the present disclosure.
Figure 3:
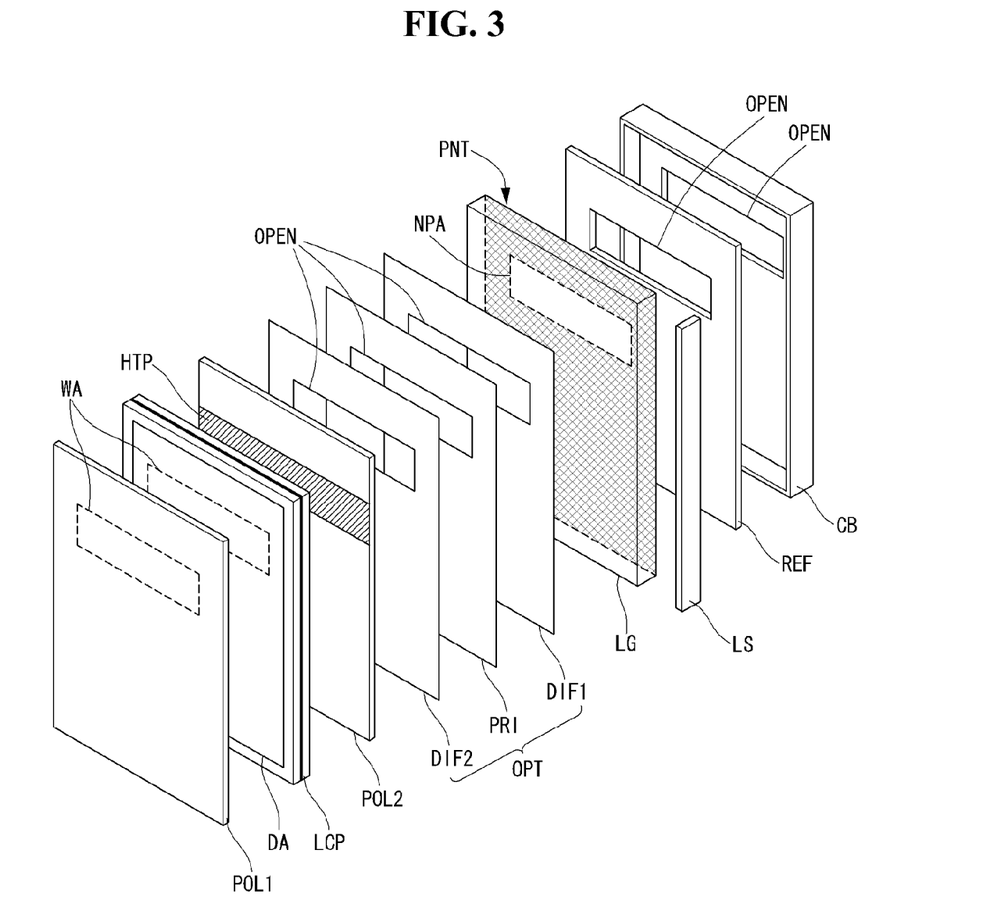
FIG. 3 is an assembling perspective view illustrating a hybrid type liquid crystal display device according to the second embodiment of the present disclosure.
Figure 4:
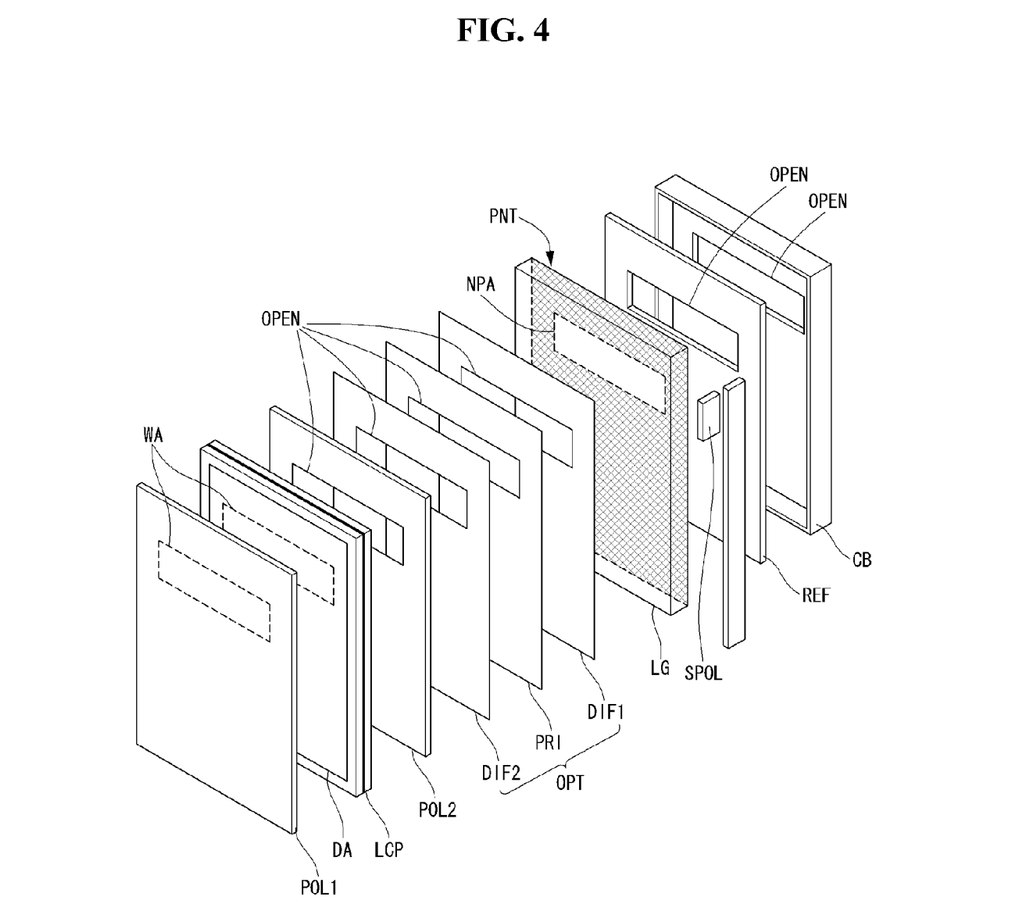
FIG. 4 is an assembling perspective view illustrating a hybrid type liquid crystal display device according to the third embodiment of the present disclosure.
Figure 5:
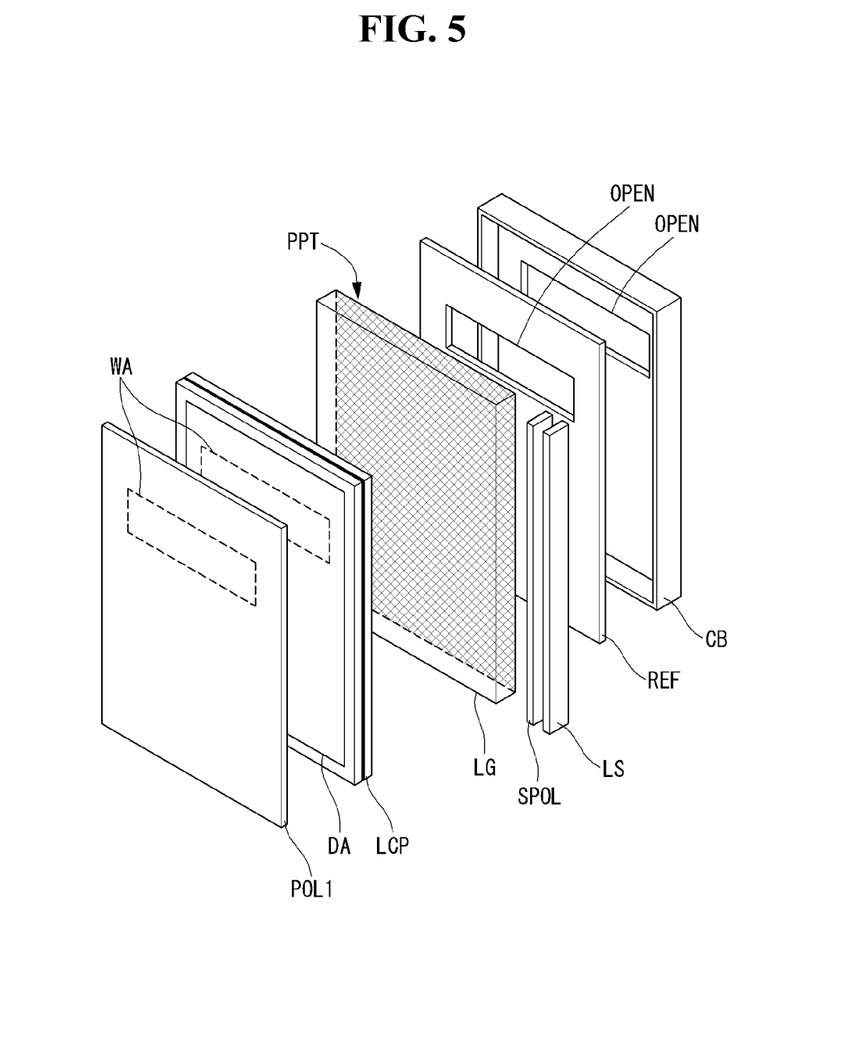
FIG. 5 is an assembling perspective view illustrating a hybrid type liquid crystal display device according to the fourth embodiment of the present disclosure.

Referring to attached FIGS. 2 to 6, preferred embodiments of the present disclosure will be explained. FIG. 2 is an assembling perspective view illustrating a hybrid type liquid crystal display device according to the first embodiment of the present disclosure. FIG. 3 is an assembling perspective view illustrating a hybrid type liquid crystal display device according to the second embodiment of the present disclosure. FIG. 4 is an assembling perspective view illustrating a hybrid type liquid crystal display device according to the third embodiment of the present disclosure. FIG. 5 is an assembling perspective view illustrating a hybrid type liquid crystal display device according to the fourth embodiment of the present disclosure. And, FIG. 6 is a perspective view illustrating one applicational example of a hybrid type liquid crystal display device according to the present disclosure.

Figure 6:
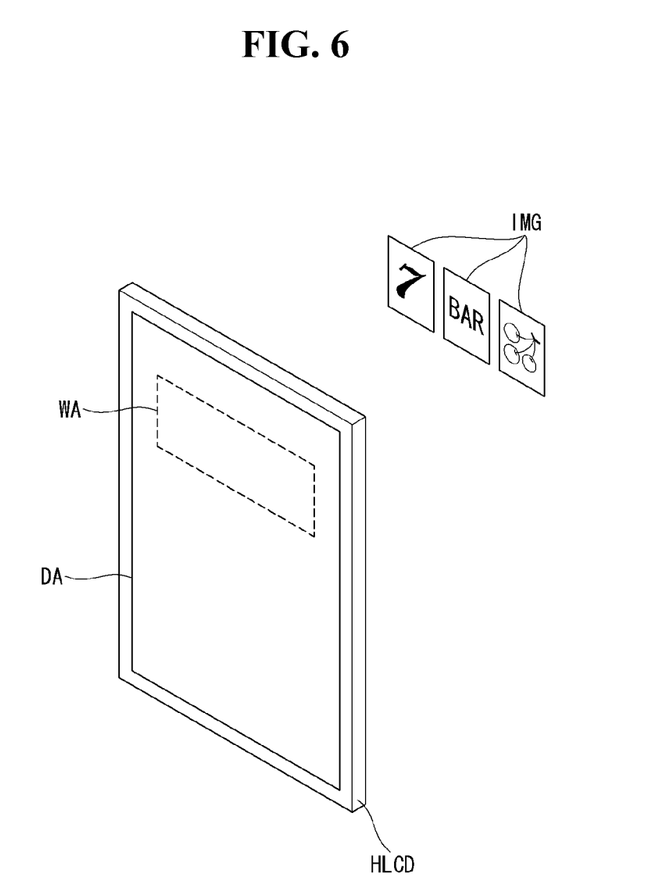
FIG. 6 is a perspective view illustrating one applicational example of a hybrid type liquid crystal display device according to the present disclosure.

Referring to FIG. 6, firstly, the hybrid type liquid crystal display device HLCD according to the present disclosure has a liquid crystal display panel (or 'LCD panel') LCP including a display area DA representing the video data. In addition, the hybrid type LCD HLCD has a window area WA which is defined within the display area DA, and through which an external image IMG such as a picture positioned behind the rear side of the LCD panel LCP can be shown at the front side of the LCD panel LCP.

The hybrid type liquid crystal display device HLCD according to the present disclosure can show the video data on the display area DA like the conventional method. At the same time, through the window area WA, some portions of the display area DA defined by the manufacturer, the designer or the user, the external images IMG such as pictures or drawings installed behind the rear surface of the LCD panel LCP.

For instances, assume that a new game machine in that the liquid crystal display device is combined with the conventional slot machine. For the conventional slot machine, pulling down the lever, a plurality of wheels having various symbols is rotated by the mechanical devices. When the rotation of the wheel is stopped, the point is shown according to the arraying results of the symbols. By installing the hybrid type liquid crystal display device in front of the conventional game machine, it is possible to suggest various video data using the liquid crystal display device. At the same time, it is possible to enjoy the game through the window area WA. Furthermore, when point combinations of the symbols are accomplished, signals representing the point combinations can be flashed using the liquid crystal display panel.

Hereinafter, some preferred embodiments for the hybrid type liquid crystal display device will be explained. FIGS. 2 to 5 mainly illustrate the key elements playing important role for implementing the main concepts of the present disclosure. Therefore, if required, any further elements can be added for comprising better liquid crystal display device.

Referring to FIG. 2, the hybrid type liquid crystal display device according to the first embodiment comprises a liquid crystal display panel LCP having a display area DA. At the front side and rear side of the LCD panel LCP, a first polarization film POL1 and a second polarization film POL2 are disposed, respectively. The first polarization film POL1 has a first polarizing axis, and the second polarization film POL2 has a second polarizing axis perpendicular to the first polarizing axis.

Within the display area DA, a window area WA is defined. In FIG. 2, the window area WA exists not physically, but programically in the liquid crystal display panel LCP. Therefore, the window area WA is represented in dotted line not solid line.

At the rear side of the second polarization film POL2, a plurality of optical sheets OPT is disposed. The optical sheets OPT include a first diffusion film DIF1, a prizm sheet PR1 and a second diffusion film DIF2 which are stacked together. Especially, the second diffusion film DIF2 closer to the LCD panel LCP has a dual brightness enhancement film (or 'DBEF').

At the rear side of the optical sheets OPT, a light guide panel LG is located. At least one side surface or two side surfaces facing each other, a light source LS is disposed. In the present disclosure, it is ensure that an external image located behind the LCD panel LCP can be shown through the LCD panel LCP at the front of the LCD panel LCP. Therefore, it is more preferable that the light source LS is disposed at the side surface of the light guide panel LG.

The light guide panel LG receives the light from the light source LS through the side surface, diffuses the light in the body of the light guide LG and then guides the light to the front surface facing with the LCD panel LCP. Therefore, at the rear surface of the light guide panel LG, a plurality of dot pattern PNT is formed helping the reflection and diffusion of the light to the front surface of the light guide panel LG. The dot pattern PNT may be formed by printing a material having a higher refractive index than that of the light guide panel LG. If this dot pattern PNT is formed to cover all area of the rear surface of the light guide panel LG, it is not possible to see the external image through the light guide panel LG. That is, even though the dot pattern PNT has the half-transmitiveness property, it is hard to see an image through this dot pattern PNT. Therefore, it is preferable that the dot pattern PNT is not formed within the window area WA. Consequently, according to the first embodiment of the present disclosure, the light guide panel LG comprises a non-pattern area NPA corresponding to the window area WA.

Behind the rear surface of the light guide panel LG, a reflection sheet REF is disposed. The reflection sheet REF reflects the light lost from the light guide panel LG through the rear surface back to the LCD panel LCP. Like the dot pattern, it is hard to see any external image disposed behind the liquid crystal display device through the reflection sheet REF. Therefore, it is preferable to remove some portions of the reflection sheet REF corresponding to the window area WA. Consequently, the reflection sheet REF according to the first embodiment of the present disclosure includes an aperture area OPEN corresponding to the window area WA.

In addition, behind the rear surface of the reflection sheet REF, a cover bottom CB is disposed for housing the back light unit (combined element of the optical sheet OPT, the light guide panel LG, the light source LS, and the reflection sheet REF) at the rear side of the LCD panel LCP. The cover bottom CB is a vessel type element made of the metal materials or the insulating materials. Therefore, like the reflection sheet REF, it is preferable to remove some portions of the cover bottom CB corresponding to the window area WA. Consequently, the cover bottom CB according to the first embodiment of the present disclosure includes an aperture area OPEN corresponding to the window area WA.

The LCD panel according to the first embodiment of the present disclosure can be applied to the hybrid type liquid crystal display device HLCD shown in FIG. 6. According to the first embodiment, the LCD panel LCP is disposed between the first polarization film POL1 and the second polarization film POL2. Furthermore, all plane surface areas of the LCD panel LCP is covered by the first and the second polarization films POL1 and POL2. Therefore, in the normally black mode (the black scale is represented when the electric power is off and the liquid crystal layer is not operated), the LCD panel LCP can not show the external image IMG through the window area WA. However, when the hybrid type LCD HLCD is working and the window area WA represents the white gray scale, the external image IMG located behind the LCD panel LCP can be shown through the window area WA. Furthermore, when the LCD panel LCP represents any video data on the window area WA, it is possible to see new complex images combined the external image IMG with the video data.

Referring to FIG. 3, a hybrid type liquid crystal display device according to the second embodiment of the present disclosure will be explained. In the second embodiment, many elements may be the same with the first embodiment. Therefore, detailed explanation for the same element will be omitted.

The different point of the second embodiment from the first embodiment is on the second polarization film POL2. Like the first embodiment, when the second polarization film POL2 is the common product, it is hard to clearly see the external image IMG at the front side of the LCD panel LCP because the common polarization film has low light transmittance. In order to represent the external image IMG more clearly, some portions of the second polarization film POL2 corresponding to the window area WA can be replaced with a high transmissive polarization film HTP. The high transmissive polarization film HTP has the light transmissivity over 60%. Consequently, the second polarization film POL2 according to the second embodiment comprises a high transmissive polarization film HTP corresponding to the window area WA.

The LCD panel LCP according to the second embodiment of the present disclosure would be applied to the hybrid type liquid crystal display panel HLCD shown in FIG. 6. The liquid crystal display panel LCP is disposed between the first polarization film POL1 and the second polarization film POL2. Therefore, in the normally black mode (the black scale is represented when the electric power is off and the liquid crystal layer is not operated), it is hard to see the external image IMG through the window area WA of the LCD panel LCP. However, when the hybrid type LCD HLCD is working and the window area WA represents the white gray scale, the external image IMG located behind the LCD panel LCP can be shown through the window area WA. Furthermore, when the LCD panel LCP represents any video data on the window area WA, it is possible to see new complex images combined the external image IMG with the video data.

Referring to FIG. 4, a hybrid type liquid crystal display device according to the third embodiment of the present disclosure will be explained. In this third embodiment, presented is a structure for solving non-visibility of the external image IMG being blocked by the combination of the first and second polarization films POL1 and POL2. Many basic elements may be the same with the first embodiment. The different point is on the structures of the second polarization film POL2 and the light source LS.

The second polarization film POL2 in the third embodiment has an aperture area OPEN corresponding to the window area WA. In this case, the back light through this aperture area OPEN of the second polarization film POL2 is not polarized, so that it is not possible to correctly represent video images on the window area WA of the LCD panel LCP. To prevent this problem, it is preferable that the back light which will be incident onto the aperture area OPEN of the second polarization film POL2 should be polarized.

In the third embodiment, it is preferable to dispose a side polarization film SPOL between the light source LS and the light guide panel LG. Especially, the side polarization film SPOL can have the same polarizing axis with the second polarization film POL2. As a result, the back light incident into the aperture area OPEN of the second polarization film POL2 has the same polarization condition with that of the back light passing the second polarization film POL2. That is, a back light polarized to the second direction enters into the LCD panel LCP, so that it is possible to represent video image on all display area DA of the LCD panel LCP including the window area WA. In addition, as the portions of the second polarization film POL2 corresponding to the window area WA is removed, the external image can be more clearly shown.

The LCD panel according to the third embodiment of the present disclosure can be applied to the hybrid type liquid crystal display device HLCD shown in FIG. 6. In the third embodiment, the LCD panel LCP is disposed between the first polarization film POL1 and the second polarization film POL2. However, the second polarization film POL2 has an aperture area OPEN corresponding to the window area WA to pass the external image IMG. Therefore, in the normally black mode (the black scale is represented when the electric power is off and the liquid crystal layer is not operated), the LCD panel LCP can show the external image IMG through the window area WA. In addition, when the hybrid type LCD HLCD is working and the window area WA represents the white gray scale, the external image IMG located behind the LCD panel LCP can also be shown through the window area WA. Furthermore, when the LCD panel LCP represents any video data on the window area WA, it is possible to see new complex images combined the external image IMG with the video data.

However, in the third embodiment, it is possible to implement the video data on the window area WA properly just when a polarized back light having the same polarization axis with the second polarization film POL2 enters through the window area WA. If the gap portion between the hybrid type liquid crystal display device HLCD and the external image IMG is exposed under the environmental condition, any unpolarized light such as sunlight or lamp light can enter into the hybrid type liquid crystal display device HLCD via the aperture area OPEN of the cover bottom CB and then the unpolarized light can enter into the window area WA of the LCD panel LCP. It causes a problem that it is possible to properly represent video data on the window area WA. Therefore, when the hybrid type liquid crystal display device HLCD according to the third embodiment, it is preferable to block any unpolarized light from entering through the aperture area OPEN using a housing means such as a dark chamber. As one example of the dark chamber, such a manner that the cover bottom CB houses the back light unit, the hybrid type liquid crystal display device HLCD can be housed with the external image IMG using the dark chamber.

Referring to FIG. 5, a hybrid type liquid crystal display device according to the fourth embodiment of the present disclosure will be explained. In the fourth embodiment, the structure applied to the aperture area of the second polarization film in the third embodiment is extended to all over the display area of the LCD panel.

Referring to FIG. 5, a hybrid type liquid crystal display device according to the fourth embodiment comprises an LCD panel LCP having a display area DA. In the display area DA, a window area WA is defined. The window area WA is the area through which an external image IMG located outside of the liquid crystal display device can be shown in front of the liquid crystal display device. On the front side of the LCD panel LCP, a first polarization film POL1 is disposed, but at the rear side of the LCD panel LCP there is no polarization film. The first polarization film POL1 has a first polarization axis.

Unlike the other embodiments, the liquid crystal display panel LCP according to the fourth embodiment does not comprise the second polarization film and the optical sheets. Just a light guide panel is disposed at the rear side of the LCD panel LCP.

At least one of the four side surface of the light guide panel LCP, a light source LS is disposed. In the present disclosure, it is ensure that an external image located behind the LCD panel LCP can be shown through the LCD panel LCP at the front of the LCD panel LCP. Therefore, it is more preferable that the light source LS is disposed at the side surface of the light guide panel LG.

The liquid crystal display device represents the video image by disposing two polarization films at front and rear sides of the LCD panel, operating liquid crystal material between the two polarization films and then controlling the polarization condition of the polarized back light. Therefore, in any way, a polarized light should be entered into the liquid crystal display panel. In the fourth embodiment, as a first polarization film POL1 is disposed only on the front side of the LCD panel LCP, it is preferable to use a polarized light having a polarization axis perpendicular to that of the first polarization film POL1.

One example for using the polarized back light, a side polarization film SPOL is disposed between the light source LS and the light guide panel LG so that a polarized light can enter into the light guide panel LG. Especially, the side polarization film SPOL should have a second polarization axis perpendicular to the first polarization axis.

The light guide panel LG receives the light from the light source via the side surface, diffuses the light within all volume of the light guide panel LG, and radiates the light to the front surface facing with the LCD panel LCP as a plan back light. Conventionally, at the rear side of the light guide panel LG, there may be the dot patterns for reflecting and diffusing the light to the front side of the light guide panel LG. However, in the fourth embodiment, any dot pattern may not be included. Rather, instead of the dot patterns, a plurality of polarized light protection pattern PPT can be included on the rear surface of the light guide panel LG, in order to help the polarized light incident from the light source LS to diffuse within all volume of the light guide panel LG, to maintain the polarization property of the light and to guide the polarized light to the front side of the light guide panel LG. Unlike the dot pattern, the polarized light protection pattern PPT has high transmissivity of light, so the external image can be easily seen through the polarized light protection pattern PPT. As a result, on the contrary with the other embodiments, the light guide panel LG of the fourth embodiment may not include a non-pattern area NPA corresponding to the window area WA.

Behind the rear surface of the light guide panel LG, a reflection sheet REF is disposed. The reflection sheet REF reflects the light lost from the light guide panel LG through the rear surface back to the LCD panel LCP. It is hard to see any external image disposed behind the liquid crystal display device through the reflection sheet REF. Therefore, it is preferable to remove some portions of the reflection sheet REF corresponding to the window area WA. Consequently, the reflection sheet REF according to the first embodiment of the present disclosure includes an aperture area OPEN corresponding to the window area WA.

In addition, behind the rear surface of the reflection sheet REF, a cover bottom CB is disposed for housing the back light unit (combined element of the optical sheet OPT, the light guide panel LG, the light source LS, and the reflection sheet REF) at the rear side of the LCD panel LCP. The cover bottom CB is a vessel type element made of the metal materials or the insulating materials. Therefore, like the reflection sheet REF, it is preferable to remove some portions of the cover bottom CB corresponding to the window area WA. Consequently, the cover bottom CB according to the first embodiment of the present disclosure includes an aperture area OPEN corresponding to the window area WA.

The LCD panel according to the fourth embodiment of the present disclosure can be applied to the hybrid type liquid crystal display device HLCD shown in FIG. 6. According to the first embodiment, the LCD panel LCP has only the first polarization film POL1 on the front side. Furthermore, the second polarization film POL2 is not directly facing with the rear surface of the light guide panel LG. The main purpose of the second polarization film POL2 is to polarize the light perpendicular to the polarization axis of the first polarization film POL1. Therefore, instead of the second polarization film POL2, a side polarization film SPOL is disposed between the light source LS and the light guide panel LG to make the polarized light.

In the fourth embodiment, as the light from the light source LS is polarized, the light out from the light guide panel LG maintains the polarized condition until it reaches to the LCD panel LCP. Therefore, the optical sheet can be removed, and a polarized light protection pattern PPT can be disposed at the rear surface of the light guide panel LG. The polarized light protection pattern PPT is for maintaining the polarization condition of the light, diffusing the polarized light over all display area DA of the LCD panel LCP evenly, and focusing the polarized light to the front direction of the light guide panel LG.

The reflection sheet REF and the cover bottom CB have aperture areas OPEN corresponding to the window area WA for passing through the external image IMG. Therefore, LCD panel LCP can show the external image IMG through the window area WA, when it is in normally white mode (the white scale is represented when the electric power is off and the liquid crystal layer is not operated) as well as when it is in the normally black mode (the black scale is represented when the electric power is off and the liquid crystal layer is not operated). In addition, when the hybrid type LCD HLCD is working and the window area WA represents the white gray scale, the external image IMG located behind the LCD panel LCP can also be shown through the window area WA. Furthermore, when the LCD panel LCP represents any video data on the window area WA, it is possible to see new complex images combined the external image IMG with the video data.

In the fourth embodiment, it is possible to implement the video data on the window area WA properly just when a polarized back light having the same polarization axis with the second polarization film POL2 enters through the window area WA. If the gap portion between the hybrid type liquid crystal display device HLCD and the external image IMG is exposed under the environmental condition, any unpolarized light such as sunlight or lamp light can enter into the hybrid type liquid crystal display device HLCD via the aperture area OPEN of the cover bottom CB and then the unpolarized light can enter into the window area WA of the LCD panel LCP. It causes a problem that it is possible to properly represent video data on the display area DA including the window area WA. Therefore, when the hybrid type liquid crystal display device HLCD according to the fourth embodiment, it is preferable to block any unpolarized light from entering through the aperture area OPEN using a housing means such as a dark chamber. As one example of the dark chamber, as such a manner that the cover bottom CB houses the back light unit, the hybrid type liquid crystal display device HLCD can be housed with the external image IMG using the dark chamber.

While the embodiment of the present invention has been described in detail with reference to the drawings, it will be understood by those skilled in the art that the invention can be implemented in other specific forms without changing the technical spirit or essential features of the invention. Therefore, it should be noted that the forgoing embodiments are merely illustrative in all aspects and are not to be construed as limiting the invention. The scope of the invention is defined by the appended claims rather than the detailed description of the invention. All changes or modifications or their equivalents made within the meanings and scope of the claims should be construed as falling within the scope of the invention.

What is claimed is:

1. A hybrid type liquid crystal display device comprising:
   a liquid crystal display panel having a display area, and a window area defined within the display area as a part of the display area, wherein an image data is displayed at the window area;
   a first polarization film disposed at a front surface of the liquid crystal display panel with a size corresponding to the display area and a first polarization axis;
   a light guide panel disposed at a rear surface of the liquid crystal display panel;
   a light source disposed at a side surface of the light guide panel for providing a back light into the light guide panel;
   a second polarization film disposed behind the liquid crystal display panel for polarizing the back light to a second polarization axis perpendicular to the first polarization axis;
   a reflection sheet disposed at a rear surface of the light guide panel for reflecting the back light to the front surface of the light guide panel, and having an aperture area corresponding to the window area; and
   a cover bottom disposed at the rear surface of the reflection sheet for housing the light guide panel and the light source, and having an aperture portion corresponding to the window area,
   wherein an image disposed outside of the liquid crystal display panel is shown in front of the liquid crystal display panel through the window area;
   wherein the second polarization film includes:
   a side polarization film disposed on the side surface of the light guide panel and between the light source and the light guide panel, wherein the side polarization film polarizes a portion of the back light corresponding to the window area to have the second polarization axis; and a lower polarization film disposed on the rear surface of the liquid crystal display panel, and having an opening area corresponding to the window area, wherein the lower polarization film polarizes a portion of the back light corresponding to the display area excepting the window area to have the second polarization axis.

2. The device according to the claim 1, wherein the second polarization film is disposed between the light guide panel and the light source to polarize the back light to the second polarization axis.

3. The device according to the claim 2, wherein the light guide panel includes a plurality of polarized light protection patterns formed on a rear surface of the light guide panel to protect the polarized light having the second polarization axis.

4. The device according to the claim 1, wherein the light guide panel includes:
   a plurality of polarized light protection patterns disposed on a portion of a rear surface of the light guide panel corresponding to the window area to protect the polarized light having the second polarization axis; and
   a plurality of reflective patterns disposed on a portion of a rear surface of the light guide panel excepting the window area to reflect the back light to a front surface of the light guide panel.

5. The device according to the claim 4, further comprising:
   optical sheets disposed between the lower polarization film and the light guide panel, wherein a portion of the optical sheets corresponding to the window area is removed.

6. The device according to the claim 5, wherein the optical sheets include:
   a lower diffusion film disposed on a front surface of the light guide panel;
   a prism sheet stacked on a front surface of the lower diffusion film; and
   an upper diffusion film stacked on a front surface of the prism sheet.

7. The device according to the claim 1, wherein the second polarization film includes a lower polarization film disposed between the liquid crystal display panel and the light guide panel with a plan size corresponding to the display area.

8. The device according to the claim 7, wherein the lower polarization film has a portion corresponding to the window area, wherein the portion of the lower polarization film has light transmissivity of 60%.

9. The device according to the claim 7, wherein the light guide panel includes:
   a plurality of reflective patterns disposed on a portion of a rear surface of the light guide panel excepting the window area to reflect the back light to a front surface of the light guide panel,
   wherein the window area of the portion of the rear surface of the light guide panel has no pattern.

10. The device according to the claim 9, further comprising:
    optical sheets disposed between the lower polarization film and the light guide panel, wherein a portion of the optical sheets corresponding to the window area is removed.

11. The device according to the claim 10, wherein the optical sheets include:
    a lower diffusion film disposed on a front surface of the light guide panel;
    a prism sheet stacked on a front surface of the lower diffusion film; and
    an upper diffusion film stacked on a front surface of the prism sheet.

* * * * *